Patented Dec. 23, 1941

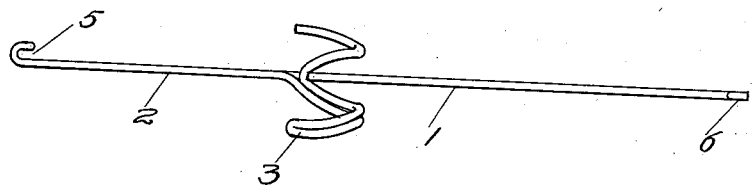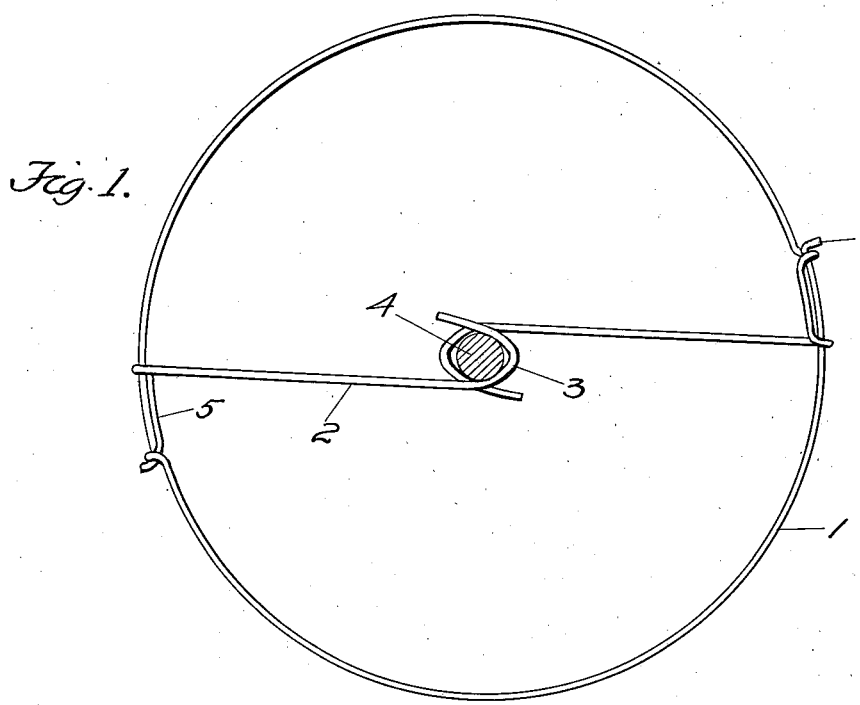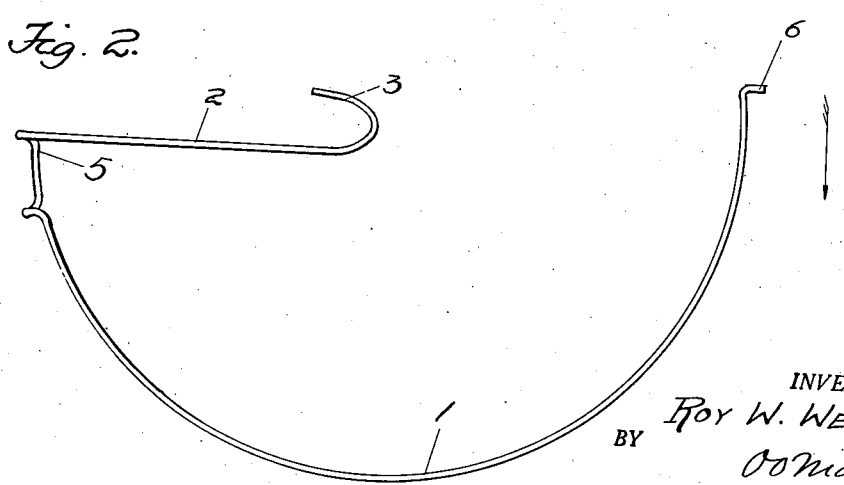

2,267,004

UNITED STATES PATENT OFFICE 2,267,004

PLANT SUPPORT

Roy W. Weihe, West Los Angeles, Calif.

Application June 28, 1940, Serial No. 343,001

8 Claims. (Cl. 47—47)

The present invention has relation to plant supports and refers more particularly to a device for guiding and supporting the branches of bushy and flowering plants in green houses, in the home, or wherever such plants are found.

It is a general object of the invention to provide a simple, inexpensive, and conveniently operated device of the class referred to. More particularly, the object is to provide a device which is mountable on a stake, such as usually provided to support a plant, from the bottom or the side of the plant. Another object is to provide a device made in two parts, each of which is separately attached to the stake, whereupon the two parts are assembled, thereby at the same time to clamp the device tightly in position on the stake. A still further object is to provide a device made in two parts which may be exactly alike.

With these and other objects in view, the invention resides in the combination hereinafter fully described and illustrated in the appended drawing, of which:

Fig. 1 is a plan view of the device of the invention as it appears when mounted in position on a stake;

Fig. 2 shows one of the parts before assembling; and,

Fig. 3 is a side elevation of the part of Fig. 2, as viewed in the direction of the arrow 3.

Because the two component parts of the invention, as illustrated in the drawing, are alike, it is understood that the description of one of these parts applies equally as well to the other. It is noticed that the part 1 is substantially semicircular and that it is made with an inwardly directed arm 2, the inner end of which is shaped to form a bifurcated hook 3, of a shape snugly to fit the stake 4. The wire is, at the point from which the inwardly extending arm 2 starts, made with an inwardly directed loop 5, and the opposite end of the wire terminates in a hook 6. This substantially completes the description of each of the component parts.

The manner in which the device may be placed in position to support a plant must entirely depend upon the preference and dexterity of the operator. The method of assembly now to be described is therefore merely illustrative of one manner of operation, and is not necessarily the most convenient or efficient method of performing this operation.

The stake is, in the first place, pushed into the ground substantially in the center of the plant to be supported, whereupon one of the parts may be picked up by the fingers of the left hand, and moved into contact with the stake. During this operation, a portion of the branches of the plant are by the other hand pushed into the space within the wire which, in order to facilitate this operation, conveniently may be given a circular motion around the stake. When about one-half of the branches of the plant have been placed within the wire in this fashion, it becomes necessary to pick up the second part of the device by the fingers of the right hand and to place the end of this part within the loop 5 of the first part, at the same time pushing the remaining branches into the space within the second part, whereupon the hook 3 of the latter part is slipped into engagement with the stake. When this operation is completed, it is found that the tension of the wires forming the two assembled parts is sufficient to maintain the device firmly in position on the stake. And it is noticed that the end hooks 6 maintain the parts locked together. It was above stated that the part 1 is substantially semicircular. It is to be noted, however, that the wire may be formed into a more open loop, or even be left entirely straight, in order to increase the tension of the assembled device on the stake supporting it when the wires are drawn into circular shape.

I am aware that other devices have been provided for similar purposes, but such devices as have come to my notice have been made in one piece, from one piece of wire, having a central clasp insertable on the stake from the end of the latter only. This makes it very difficult to bring the branches, particularly of flowering plants, such as roses, carnations, chrysanthemums, and the like, within the devices as it is entered on the stake, without seriously mutilating the plant. Also, it becomes necessary to employ stakes of substantially the same thickness in order to be able to enter the clasp therein and to maintain it firmly in position therein.

In the device of the invention, on the other hand, the parts may be applied from the side or bottom of the plant, each gathering within it a portion of the plant growth as it is entered without danger of mutilating the plant. The center hook of the two parts may be semicircular, but is preferably of a more elongated shape, substantially as indicated in Fig. 1, in order that the hooks may better accommodate themselves to and more tightly grip stakes of various sizes. Wires of the proper spring tension will draw these hooks very firmly around the stake when the outer ends of the wires are drawn into the loops 5.

The shape of the loop 5 is very important. Some one-piece structures, of which I have knowledge, are made with end hooks, similar to the hooks 6, and these hooks engage corners or eyes formed in the wire constituting the device. While such hooks, entered in this manner, may resist tendency on the part of the device to draw apart endwise, no means is provided resisting other forces, such as pressure of the branches or accidental touch by the attendant, tending to raise the hooks out of engagement and so defeating the purpose of the device.

But the loops 5 maintain the wire ends locked in position so securely that only a decided centripetal finger pressure can separate the parts. No such pressure emanates from the plant. The loops 5 serve another important purpose. They extend far enough along the wires circumferentially to maintain the two members of the device in continued alignment.

Because it is the spring tension of the wires around the entire circumference of the device which maintains the hooks 3 in engagement with the stake, it is found that the device may readily be adjusted axially on the stake. In case the surface of the stake, as, for example, when a bamboo stick is employed, should be found uneven enough to impede such axial adjustment, it is merely required lightly to press the joints at the loops 5 inward, and the hooks will readily pass over such uneven places.

The device above described is merely illustrative of the invention and modifications, within the scope of the appended claims, may be incorporated. It is, for example, not essential that the hooks 3 are centrally placed within the device, but, of course, if they are off center, it means that the two parts of the device no longer can remain alike. This would add materially to the cost of the device without apparently adding to its usefulness. But, with some plants, it may be necessary to place the stake at one side and not in the center.

I claim:

1. A plant support comprising two substantially semicircular parts, each made from a piece of resilient wire, each part having an arm centripetally directed and terminating in a hook, the wire of each part having an inwardly directed loop at the point where said arm extends from the part and terminating at the other end in a hook.

2. A plant support comprising two parts, each part being made from resilient wire semicircular in shape and having the wire at one end bent to form a stop, the other end of the wire being centripetally bent and terminating in a bifurcated hook, there being at or near the point where the wire is bent centripetally an inwardly directed loop.

3. A device mountable on a stake to support a plant comprising two resilient parts, each being substantially semicircular in shape and having a centripetally directed arm terminating in a hook for engagement with said stake, there being an inwardly directed loop in each part close to said centripetal arm for receiving the outer free end of the other part, and a hook at the free end of each part to form a stop to prevent disengagement of one part from the loop of the other part.

4. A substantially circular structure mountable on a stake to support a plant, said structure being made in two parts, each having a hook engaging said stake and made with a loop at one end for receiving the opposite end of the other part, the ends of the parts engaging said loops being bent to form stops to prevent relative disengagement of the parts.

5. A device mountable on a stake to support a plant, said device comprising two substantially semicircular parts made from resilient material, each part having within its periphery a member shaped to engage a stake and in its periphery a loop shaped to receive the outer free end of the other part, the outer free end of each part being shaped to form a stop to prevent the ends from sliding out of said loops, the tension of the two parts, when drawn together on the stake, maintaining the device in position therein.

6. A substantially circular device mountable on a stake to support a plant, said device comprising two preferably identical parts made from resilient material, each part having a central member shaped to engage a stake, and in its periphery an inwardly directed loop shaped to receive the outer free end of the other parts, the said central members being caused to engage the stake and the free ends being drawn into the said loops against the tension of the parts, the free ends having stops to prevent the tension of the material from drawing the ends out of said loops.

7. A plant support mountable on a stake, said support being made from resilient wires formed with arms extending from one side and terminating in hooks, the wire of the support being drawn into circular shape thereby to cause said arms to extend centripetally therefrom and said hooks to engage said stake from opposite sides, the ends of the wire support being made with interfitting elements for locking the support in circularly drawn position against the tension of the wire.

8. A plant support mountable on a stake, said support comprising two curved parts made from resilient wire, each part having an arm directed into its curve and terminating in a hook shaped to engage said stake, the curved portions of the parts having interengageable elements for locking the parts together when drawn into circular shape, thereby to cause said hooks to grip the stake tightly from opposite sides.

ROY W. WEIHE.